United States Patent Office 3,357,382
Patented Dec. 12, 1967

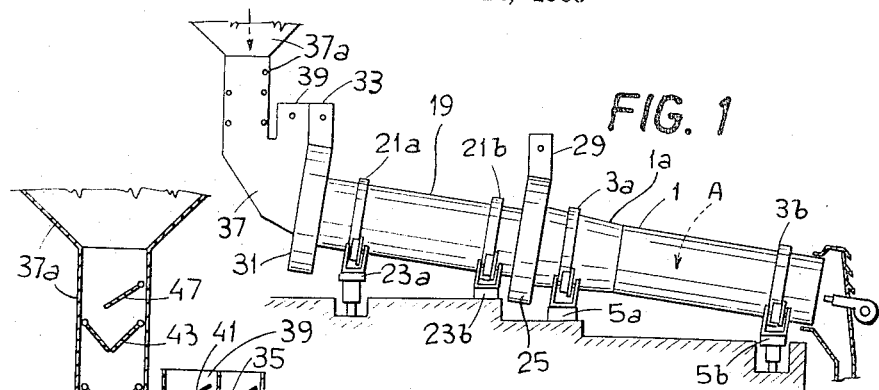
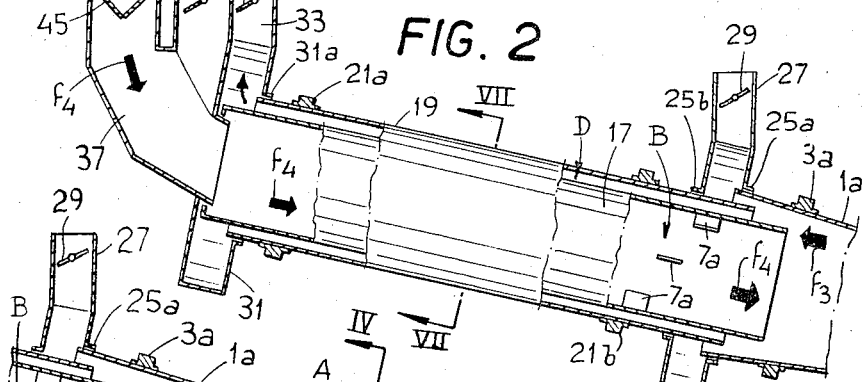
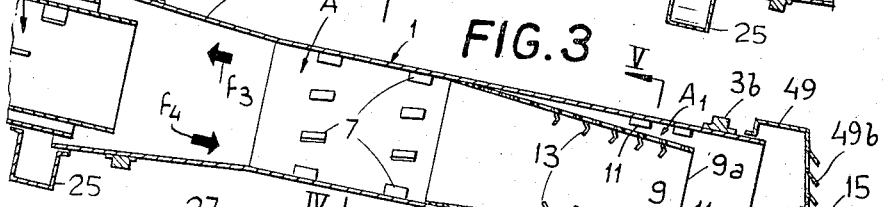
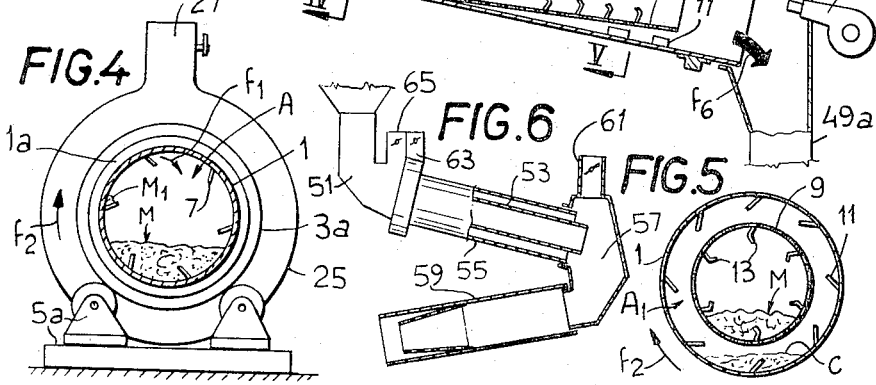
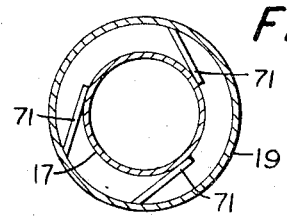

3,357,382
SOLID TRASH DRYING AND INCINERATING
FURNACE
Silvano Matteini, Via Bellosguardo 2, Florence, Italy
Filed Feb. 14, 1966, Ser. No. 527,250
Claims priority, application Italy, Feb. 17, 1965,
3,734/65; May 5, 1965, 10,343/65
19 Claims. (Cl. 110—14)

ABSTRACT OF THE DISCLOSURE

A trash incinerator in which trash is delivered into a drying zone at the upstream end of a cylindrical casing and passed in countercurrent heat exchange with discharged gases to a combustion chamber formed in a second rotatable casing wherein the dried trash is burned and discharged as ash.

The invention relates to a solid trash drying and incinerating furnace.

According to the present invention there is provided in a trash incinerator, rotary cylindrical casing means defining a combustion zone, said casing means being arranged to rotate about the longitudinal axis thereof, further rotary cylindrical casing means defining a drying zone, said further casing means being arranged to rotate about the longitudinal axis thereof and lying upstream of said combustion zone, means defining a first passage for exhaust gases from the combustion zone through the drying zone, means defining a second passage for exhaust gases from the combustion zone surrounding said further casing means, means defining a third passage for exhaust gases from the combustion zone communicating directly with said combustion zone, and valve means capable of varying selectively the flow through each said passage.

An embodiment of a furnace in accordance with the invention will now be described, by way of example, with reference to the accompanying diagrammatic drawing, in which:

FIG. 1 is an overall external view of the furnace;

FIGS. 2 and 3 illustrate a longitudinal section of a drying zone and of a combustion zone respectively;

FIGS. 4 and 5 are cross-sections on the lines IV—IV and V—V of FIG. 3,

FIG. 6 is a side elevation, partly in section, of a modified furnace in accordance with the invention, and FIG. 7 is a cross-section on the line VII—VII in FIG. 2.

Referring now to the drawing, a tubular casing 1 defines a combustion zone A and is supported by a pair of annular tracks 3a, 3b mounted on roller supports 5a, 5b. One of the supports may be arranged to rotate the casing 1, or alternatively drive means may be provided which are independent of the supports 5a, 5b. A frustoconical portion 1a of the casing lies adjacent an intake end of the casing 1.

In an intermediate portion of the zone A, vanes 7 extend from the interior surface of the casing 1 and are inclined with respect to the radial direction. The vanes are arranged to lift fractions $M_1$ of material M to discharge them, as indicated by arrow $f_1$, in the upper part of the path of the vanes 7, the casing 1 rotating in the sense indicated by arrow $f_2$. The vanes 7 may have a helical form so as to impart a swirling motion to the gases which pass upwardly through the furnace in the direction of arrow $f_3$, while the material travels downwardly in the direction of arrow $f_4$.

Downstream of the zone where the vanes 7 are located, a substantially frusto-conical sieve 9 is arranged within the combustion zone A and tapers in the direction of the arrow $f_4$, thus progressively decreasing at the end 9a the free section of the material M and defining a collection zone $A_1$ for ashes C between said section and the internal surface of the casing 1. In the zone $A_1$, the casing 1 has a plurality of small vanes 11, designed to mix and advance the ash C without raising it. The interior of the sieve is provided with a series of hooked lugs 13, which are bent in the direction of rotation and towards the intake end in the combustion zone and are intended to engage pieces of the material M during the rotation in the direction of the arrow $f_2$ and to maintain them in the upper half of their circumference path, so that said pieces are completely surrounded by the flames. The burnt material is discharged as indicated by arrow $f_6$ from the lower, open end of the casing 1. A burner 15 is arranged to form a jet of flame axially in the lower section of the combustion zone A.

A rotary tubular casing 17 defines a drying zone B, and is surrounded by a tubular wall 19 to define a gap D around the drying zone B. The tubular members 17 and 19 are interconnected by connecting bars 71 which extend tangentially to the member 17, to allow thermal expansion. The members 17, 19 are supported by two annular tracks 21a, 21b, which lie on roller supports 23a, 23b; one of the two supports may be arranged to rotate the assembly 17, 19.

The lower end of the tubular member 17 extends into the portion 1a of the casing 1, said member 17 having a diameter smaller than that of said portion 1a.

A stationary structure forms an annular manifold 25, a circumferential lip 25a of which surrounds and accommodates the end of the portion 1a of the casing 1, while a circumferential lip 25b of the manifold surrounds and accommodates the lower section of the tubular member 19. The manifold 25 is joined to a flue 27, provided with a damper valve 29. An additional stationary structure forms a further annular manifold 31, a circumferential lip 31a of which accommodates the upper end of the tubular member 19. The manifold 31 is extended to form a flue 33 having a damper valve 35.

A hopper 37 is integral with the manifold 31 and its discharge outlet extends into the upper end of the tubular member 17. A further flue 39, with a damper valve 41, is combined with the hopper 37. The upper section 37a of the hopper 37 has two double-flap valves 43, 45 linked and selectively actuated in order to cause the closure of one pair of valves and thus the opening of the other pair of valves and vice versa, to facilitate the discharge of the material to be incinerated into the hopper 37, without any leakage of flue gases through the upper section 37a of the hopper. A supplementary flap valve 47, actuated in advance with respect to the double valves 43, is intended to facilitate the closure thereof by temporarily supporting the material.

A structure 49 accommodates the discharge end portion of the casing 1 and forms a discharge hopper 49a which has air scoops 49b. The burner 15 passes through the wall of the structure 49.

The material intermittently discharged into the hopper 37a is fed continuously from the hopper 37 into the drying zone B, wherein it descends slowly in the direction of arrow $f_4$ along the zone B by the effect of the slope and rotation, and also by the effect of the vanes 7a which are similar to vanes 7; the material is mixed in continuous contact with the gases present and is heated and dried, without however, igniting. From the drying zone B, the dried material reaches the combustion zone A, into which it descends by the effect of gravity and the rotation of the casing 1. Owing to the temperature reached therein, the dried material is ignited by the combustion of the material preceding it. The vanes 7 elevate the material to the upper half of the zone and allow it to fall, thus facilitating the combustion thereof. When the material reaches the zone of the sieve 9, the ashes pass through the sieve into the zone $A_1$ where they are re-mixed by the vanes 11, without, however, being elevated by these vanes. This completes the oxidation of the particles contained in the ashes, while the ashes do not tend to be raised and thus to interfere with the combustion of the material within the sieve. Insufficiently incinerated particles and refuse retained by the sieve 9, are raised by the hooked lugs 13 and allowed to fall again in order to facilitate their combustion. The reduced inclination of the lower portion of the sieve 9 and the presence of the hooked lugs 13 slow down the passage of these particles and bodies, thus facilitating complete combustion while the associated ashes are separated out by the sieve 9. The incinerated material is discharged as indicated by the arrow $f_6$.

The burner 15 is used to initiate combustion and may be used also if the intensity of combustion decreases below a certain level.

Air enters the combustion zone from the discharge end thereof, being drawn in by the flues 27, 33, 39 and envelops the material, passing in the direction of the arrow $f_3$ and also through the sieve 9, on which the unburnt material lies. Under normal operating conditions, the flue gases are released through the flues 33 and 39 by appropriate adjustment of the valves 35 and 41, to obtain an appropriate combustion temperature (for instance of the order of 700° C. In the event of a tendency for the temperature to decrease, the draft is increased through the flue 39. In the event of a tendency for the combustion temperature to increase, the draft is increased through the flue 33, so that the heating occurs primarily as a result of draft through the gap D. It is also possible to close completely one of the two valves 35 or 41. Should an excessive temperature increase occur in the furnace, the draft is caused at least partly by the conduit 27, even to the extent of eliminating the passage of exhaust gases through the flue 39 and possibly through the flue 33. In the case of a temperature increase, it is also possible to increase the material feed. At the initiation of combustion, the draft is substantially completely derived from the flue 39.

In the modification illustrated in FIG. 6, a hopper 51 feeds a drying zone defined by a tubular member 53, which is surrounded by a tubular member 55 to form a passage for exhaust gases similar to the gap D of FIG. 2. The material from the drying zone is discharged into a casing 57, and is introduced into a combustion zone defined by a tubular casing 59. A flue 61, similar to the flue 27, is joined to the casing 57, while adjacent the hopper 51 there are provided flues 63, 65 which are similar to flues 33 and 39. In this embodiment the drying zone lies above the combustion zone and the zones have different inclinations.

It is possible to provide, in a simplified embodiment, a connection between the structures forming the drying and combustion zones, enabling them to rotate at the same speed. Alternatively, it is possible to provide means to vary the rotational speed of each of the structures forming the two chambers independently. Means may be provided for varying the inclination of the two chambers, to modify the passage of material and the degree of re-mixing during normal operation. In the embodiment of FIGS. 1 to 5, this can be effected by making the supports 5b and 23a adjustable in height. The member 19 may be stationary and integral or rigid with the annular manifolds 25 and 31.

Combustion within a rotary furnace facilitates and speeds up the oxidation, and allows at the same time the temperature of the furnace wall formed by the casing 1 to be kept relatively low. This results from the fact that the furnace wall cyclically and alternatively contacts the upper flame and the underlying relatively colder material. Thus it is possible to manufacture the furnace without any need to use refractory material, with obvious advantages, amongst which are reduced maintenance costs, the possibility of running the furnace intermittently and low initial thermal inertia. It is advisable to allow the furnace to rotate for a certain time after the end of the combustion to avoid any deformation and to facilitate thermal contraction.

I claim:
1. In a trash incinerator,
    rotary cylindrical casing means defining a combustion zone, said casing means being arranged to rotate about the longitudinal axis thereof,
    further rotary cylindrical casing means defining a drying zone, means for delivering trash into the drying zone at the upstream end thereof, said further casing means being arranged to rotate about the longitudinal axis thereof, and lying upstream of said combustion zone,
    means defining a first passage for exhaust gases from the combustion zone through the drying zone,
    means defining a second passage for exhaust gases from the combustion zone surrounding said further casing means,
    means defining a third passage for exhaust gases from the combustion zone communicating directly with said combustion zone, and
    valve means capable of varying selectively the flow through each said passage.
2. An incinerator according to claim 1, wherein said casing means and further casing means are inclined to the horizontal.
3. In an incinerator according to claim 2,
    means for adjusting the inclination of said casing means.
4. In an incinerator according to claim 2,
    means for adjusting the inclination of said further casing means.
5. An incinerator according to claim 1, wherein said casing means and further casing means lie on a common axis.
6. An incinerator according to claim 5, wherein said third passage includes
    a stationary annular manifold surrounding the upstream end of said combustion zone and a downstream end of said second passage, and
    an exhaust gas flue communicating with said manifold.
7. An incinerator according to claim 1, wherein said drying zone lies above said combustion zone and the trash being fed through said incinerator is arranged to pass through the drying zone in one direction and through the combustion zone substantially in the opposite direction.
8. An incinerator according to claim 1, wherein said means defining a second passage comprises a tubular member, and said incinerator further comprises means interconnecting said tubular member and further casing means, said means extending substantially tangentially to the said further casing means.
9. An incinerator according to claim 1, wherein said third passage includes
    a stationary annular manifold surrounding the upstream end of said combustion zone and a downstream end of said second passage, and
    means carried by said manifold permitting rotation of said means defining said second passage without permitting the escape of exhaust gases.
10. In an incinerator according to claim 1, wherein said means for delivering trash includes a trash feed hopper,
    control means in said hopper arranged to allow the feed of said trash to said drying zone substantially without the escape of exhaust gases.
11. An incinerator according to claim 10, wherein said control means comprises
    at least one pair of opposed flap valves spring-biassed to a closed position, said valves together forming a V, said hopper being rigid with said means defining said first passage.

12. In an incinerator according to claim 1,
a frusto-conical sieve mounted co-axially within said combustion zone, the downstream end thereof having a smaller cross-section than the upstream end,
said sieve being rigid with the casing means and serving to separate ash from material of which the combustion is incomplete.

13. In an incinerator according to claim 12,
a plurality of hooked lugs secured within said sieve and capable of elevating pieces of material to be burnt by engagement therewith and removal thereof to an upper part of the combustion zone, whereby combustion is facilitated.

14. In an incinerator according to claim 12,
a plurality of vanes secured within said casing means adjacent said sieve,
said vanes serving to mix and to advance the ash through the combustion zone.

15. In an incinerator according to claim 1,
a plurality of vanes, each inclined to the axis of rotation of the casing means and secured internally to the casing means.

16. An incinerator according to claim 15, wherein the vanes are arranged in the form of a helix in order to impart a swirling motion to gases passing through the combustion zone.

17. In an incinerator according to claim 1,
a burner arranged to ignite material in the combustion zone and mounted to fire into said casing means.

18. An incinerator according to claim 17, wherein the incinerator has an end wall and said burner is mounted thereon.

19. A trash incinerator comprising
an inclined rotary cylindrical casing defining therein a combustion zone having an inlet and an outlet,
drive means for rotating said casing about its longitudinal axis,
a further inclined rotary cylindrical casing defining therein a drying zone having an inlet and an outlet,
drive means for rotating said further casing about its longitudinal axis,
hopper means for the delivering of trash to the inlet of the drying zone,
a rotary cylinder surrounding said further rotary cylindrical casing and defining therewith an annular-section passage having an inlet and an outlet,
means defining an annular manifold and a flue communicating with the outlet of said annular passage, the inlet of said annular passage communicating with the outlet of the combustion zone,
means defining a further flue communicating with the outlet of the drying zone,
means defining a further annular manifold and a still further flue communicating with the outlet of the combustion zone,
a damper valve in each said flue selectively operable to control the draught through the zones, and
burner means for igniting material in the combustion zone.

References Cited
UNITED STATES PATENTS

| | | | |
|---|---|---|---|
| 1,491,894 | 4/1924 | Atkinson | 110—15 |
| 2,020,682 | 11/1935 | Granger | 110—14 |
| 2,043,459 | 6/1936 | Windecker | 110—14 |
| 2,127,328 | 8/1938 | Egan | 110—14 |
| 2,151,320 | 3/1939 | Forni | 110—14 |
| 2,238,161 | 4/1941 | Drew et al. | 110—14 |
| 2,577,659 | 12/1951 | Knipping | 110—15 |

JAMES W. WESTHAVER, *Primary Examiner.*